Dec. 29, 1970 C. VALFRE 3,551,838

NEGATIVE IMPEDANCE REPEATER

Filed May 5, 1969 3 Sheets-Sheet 2

NEGATIVE IMPEDANCE REPEATER

Filed May 5, 1969 3 Sheets-Sheet 3

United States Patent Office 3,551,838
Patented Dec. 29, 1970

3,551,838
NEGATIVE IMPEDANCE REPEATER

Cesare Valfre, Via Gianfrancesco Re 47, Turin, Italy

Continuation-in-part of application Ser. No. 554,196, May 31, 1966. This application May 5, 1969, Ser. No. 821,660
Claims priority, application Italy, May 31, 1965, 12,464/65
Int. Cl. H03f 15/00
U.S. Cl. 330—61 6 Claims

ABSTRACT OF THE DISCLOSURE

A negative impedance repeater having its input terminals connected to the primary of a first transformer and the output terminals connected to the secondary of a second transformer. The primary of the first transformer and the secondary of the second transformer are each divided in four equal winding sections, and two winding sections of each transformer are serially connected to each wire of a two-wire telephone circuit. The secondary winding of said first transformer has each terminal connected to the base of a transistor. The primary of said second transformer has its terminals connected to the emitters of the same two transistors, while the collectors of said transistors are connected to he power supply. A balancing impedance is conneced between the bases of said transistors. A diode is connected between the base and emitter of each transistor and a diode is connected between the emitter and collector of each transistor. A resistor is connected between the emitters of said transistors. The center tap of the secondary of said first transformer is grounded via a resistor-diode network, while the center tap of the primary of said second transformer is grounded through a resistor.

The present invention concerns a negative impedance repeater circuit particularly suited for telephone systems and the like.

This application is a continuation-in-part of the application Ser. No. 554,196 of the same inventor filed May 31, 1966.

These repeaters, inserted along a telephone line, draw a certain power from an approximate supply and utilize it to raise the level of the transmission.

The repeater usually comprises one or more amplifiers and the associated circuit elements necessary to make it function in a telephone circuit. Telephone repeaters must be used when the transmission equivalent of a telephone circuit drops below the value permissible for the grade of service desired.

For a better understanding of this invention, reference is made to the accompanying drawings in which.

As it is well known, a negative impedance is an impedance having a negative real component; it can be realized either with a non-linear bipole element having a portion of its voltage versus current characteristic exhibiting a negative differential resistance (for instance a tunnel diode) or by means of an active linear quadripole device acting as an impedance converter.

The latter class is diagrammatically represented in

Figure 1:
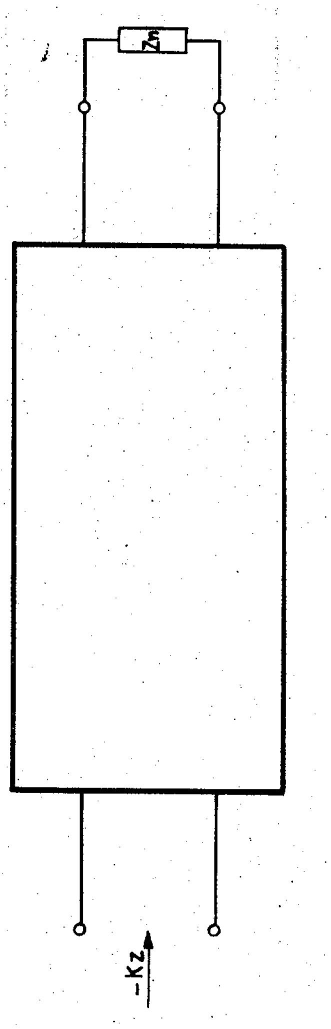
FIG. 1 shows in a general way a quadripole for the conversion of the impedance.

FIG. 1, wherein if an impedance $Z_n$ is connected across one pair of terminals of the quadripole the impedance $-KZ_n$ appears across the other pair of terminals; K being a real positive number.

The negative impedance repeater acording to the present invention is also included in this class of impedance converters.

In the negative impedance repeaters (or amplifiers, as they are also called) of known type the input and output terminals are coincident, that is, the signal to be amplified enters through a pair of terminals and the amplified signal leaves through the same terminals.

However, in the repeater according to the present invention input and output terminals are separate. This yields greater simplicity of construction, greater stability in operation and greater reliability in operation.

Existing repeaters for telephone circuits possess a number of significant drawbacks. They require a coupling with the line which, for symmetry and balancing purposes, must be accomplished by means of a single transformer. This single transformer constitutes an impedance on which the negative impedance of the amplifier is closed, and which tends to produce oscillations. Indeed, a transformer has almost always an impedance which, due to parasitic capacity, is near to zero at high frequency, and therefore is low at frequencies even remarkably distant from said high frequency. This results in generating oscillations for particular values of the impedance $Z_n$ (FIG. 1) even when the circuit is open, and consequently the maximum gains obtainable are often substantially lower than the theoretical maximum gains.

Therefore, at times, in order to have a suitable margin of stability, it becomes necessary to accept insignificant gain. Moreover, the line transformer must also have a high impedance at audiofrequencies during the passage of the signal currents. Therefore, the transformers must not saturate under such currents, otherwise oscillation would result, and as a consequence the signal currents will likewise meet a very high impedance through the repeater, and the signal voltage will undergo a conspicuous attenuation.

In order to possess limited non linear distortion and an adequate gain stability, it is necessary to use two amplifier stages such as two pairs of transistors in push-pull stages disposed in cascade. This results a high increase in the cost of the equipment due to the increased number of electric parameters which are introduced in the amplifier.

The negative impedance repeater of the present invention is stable with open terminals and is devoid of the drawbacks possessed by the conventional repeaters.

Figure 2:
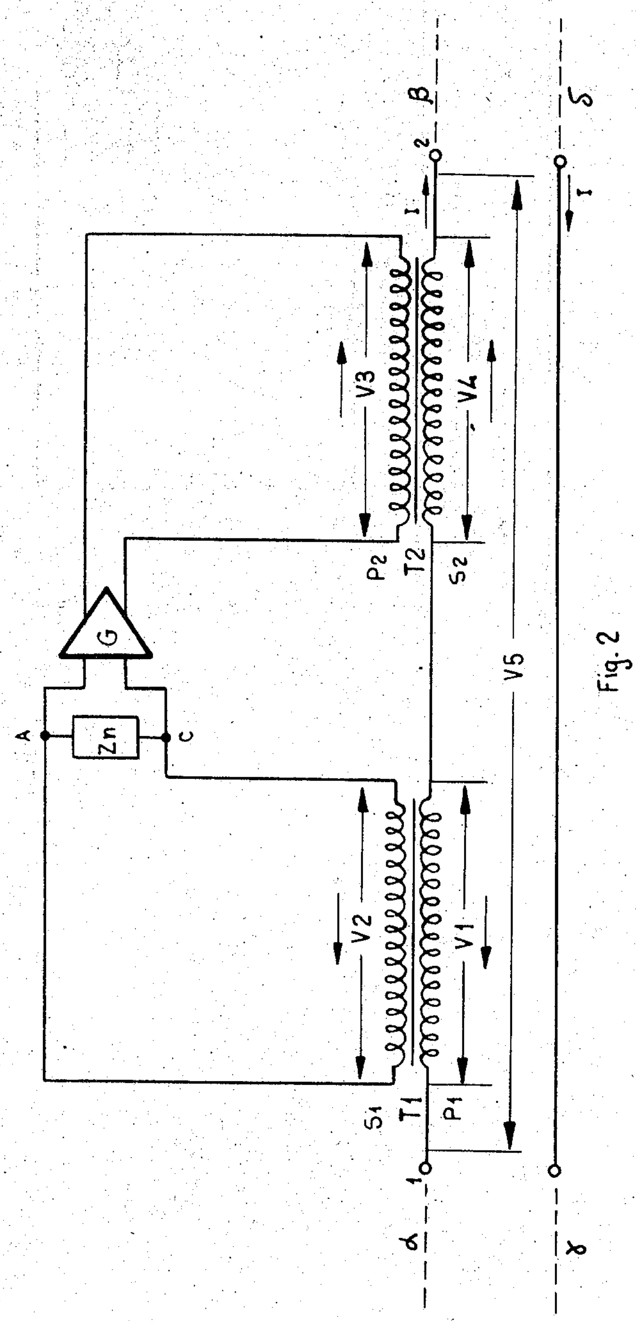
FIG. 2 shows a simplified diagram of a repeater according ot the invention.

As shown in FIG. 2, the repeater differs from that type of conventional repeater having coincident input and output, in that its input 1, 1' and output 2, 2' are completely separated and in series. As shown in FIG. 2 the repeater in the case of telephone circuits is generally inserted in series with the line.

The repeater comprises a two-terminal network, the terminals of which are indicated in FIG. 2 by 1 and 2. It will be shown later that when a particular condition occurs this two-terminal network will exhibit a negative impedance.

As shown in FIG. 2, two transformers are provided, the first of which having a primary winding $P_1$ and a secondary winding $S_1$, and the other a primary $P_2$ and a secondary $S_2$. $P_1$ is series connected to $S_2$. The direction of connection of the windings are shown in FIG. 2.

The winding $S_1$ is connected to the input of an amplifier G having a very high input impedance. An impedance $Z_n$ is connected across the input terminals of said amplifier.

The output of the amplifier is connected to the terminals of $P_2$. This amplifier G is of known type having no phase displacement between its input and output signals.

The telephone line comprises leads *c–d* and *a–b*. The repeater according to the invention is inserted in leads *a–b* between terminals 1 and 2.

The value of the impedance $Z_n$ connected to the amplifier G is chosen in accordance with the value of negative impedance which the repeater shall introduce into the line.

For the purpose of this exemplification let us assume that the transformers are perfect and ideal, and this is always assumed in this specification unless otherwise indicated. Let us consider a given current I passing through the line, and let us indicate by $n_1$ the ratio of the transformer $T_1$:

$$n_1=\frac{V_2}{V_1}$$

The impedance is indicated as $Z_n$. The current I passing through the primary of transformer $T_1$, assuming the input impedance of the amplifier G to be infinite, meets an impedance $Z_n/n_1^2$. Therefore, the voltage between the terminals of the primary of transformer $T_1$ is:

$$V_1=\frac{Z_n}{n_1^2}I$$

while the voltage across the secondary terminals is:

$$V_2=\frac{Z_n}{n_1^2}n_1I=\frac{Z_n}{n_1}I$$

This voltage is applied to the input of amplifier G and appears amplified, reduced, or unchanged at the output terminals of amplifier G according to the amplifier characteristic. The output from the amplifier G is a voltage represented by $V_3$ and is applied to the primary of transformer $T_2$. Indicating the output from the secondary of transformer $T_2$ as $V_4$ and indicating the open-circuit amplification factor of amplifier G by $A_0$ and supposing the output resistance to be null, whereby $$A_0=\frac{V_3}{V_2}$$

and also indicating with $n_2$ the ratio $$n_2=\frac{V_3}{V_4}$$

we have:

$$V_u=\frac{1}{n_2}AV_2=A\frac{Z_n}{n_1n_2}I$$

Taking into account that the output resistance $R_u$ of G is not null, there appears also added to $V_u$ the voltage drop due to the passage of the current I. From its definition $A_0$ is neither dependent upon $R_u$ nor upon $Z_n$. This drop, in first approximation, is equal to:

$$\frac{R_u}{n_2^2}I$$

The total voltage between terminals 1 and 2 is the sum of the voltage at the primary of transformer $T_1$, the voltage drop due to the current I at the output terminals of winding $S_2$ of transformer $T_2$, and the amplified voltage $V_4$. Since the phase angle of G is null, connecting the secondary windings of the transformer $T_2$ in series with the line *a–b* as shown in FIG. 2, the voltage $V_4$ results in phase with the current I and in phase opposition to the other two above named voltages (see the arrows of FIG. 2). Therefore, employing the negative sign to indicate this phase opposition, the total voltage drop across the repeater is:

$$V_5=\frac{Z_n}{n_1^2}I-A\frac{Z_n}{n_1n_2}I+\frac{R_u}{n_2^2}$$

Therefore, the repeater behaves as an impedance having the value:

$$Z=\frac{V_5}{I}=\frac{Z_n}{n_1^2}-A\frac{Z_n}{n_1n_2}+\frac{R_u}{n_2^2} \quad (1)$$

The impedance of the repeater consists of two parts, namely a positive one and a negative one. By suitably selecting the value $Z_n$, the negative part can be made larger than the positive part so that the impedance as a whole is negative.

By substituting the impedance $Z_{n1}=Z_n/n_1^2$ which the transformer $T_1$ presents on the line, the impedance of the repeater is:

$$Z=Z_{n1}\left(1-\frac{n_1A}{n_2}\right)+\frac{R_u}{n_2^2} \quad (2)$$

Keeping in mind that the term $R_u/n_2^2$ can be rendered substantially negligible by means of a high negative voltage feedback, and by a suitable choice of the ratio $n_2$, it follows that the repeater operates as an impedance converter which multiplies the impedance $Z_n$ by the factor:

$$\frac{1}{n_1^2}\left(1-\frac{n_1}{n_2}\right)A_0$$

Obviously, in order for this factor to be negative it is not necessary for $A_0$ to be greater than 1 if the ratio $n_1/n_2$ is suitably greater than one. This makes it possible to realize the amplifier G by using two transistors in push-pull with a very high degree of negative voltage feedback, such as the amplifier corresponding to the use of emitter follower output which renders stable the value of $A_0$ and reduces $R_u$ as well as the imporance of its variations.

Figure 3:
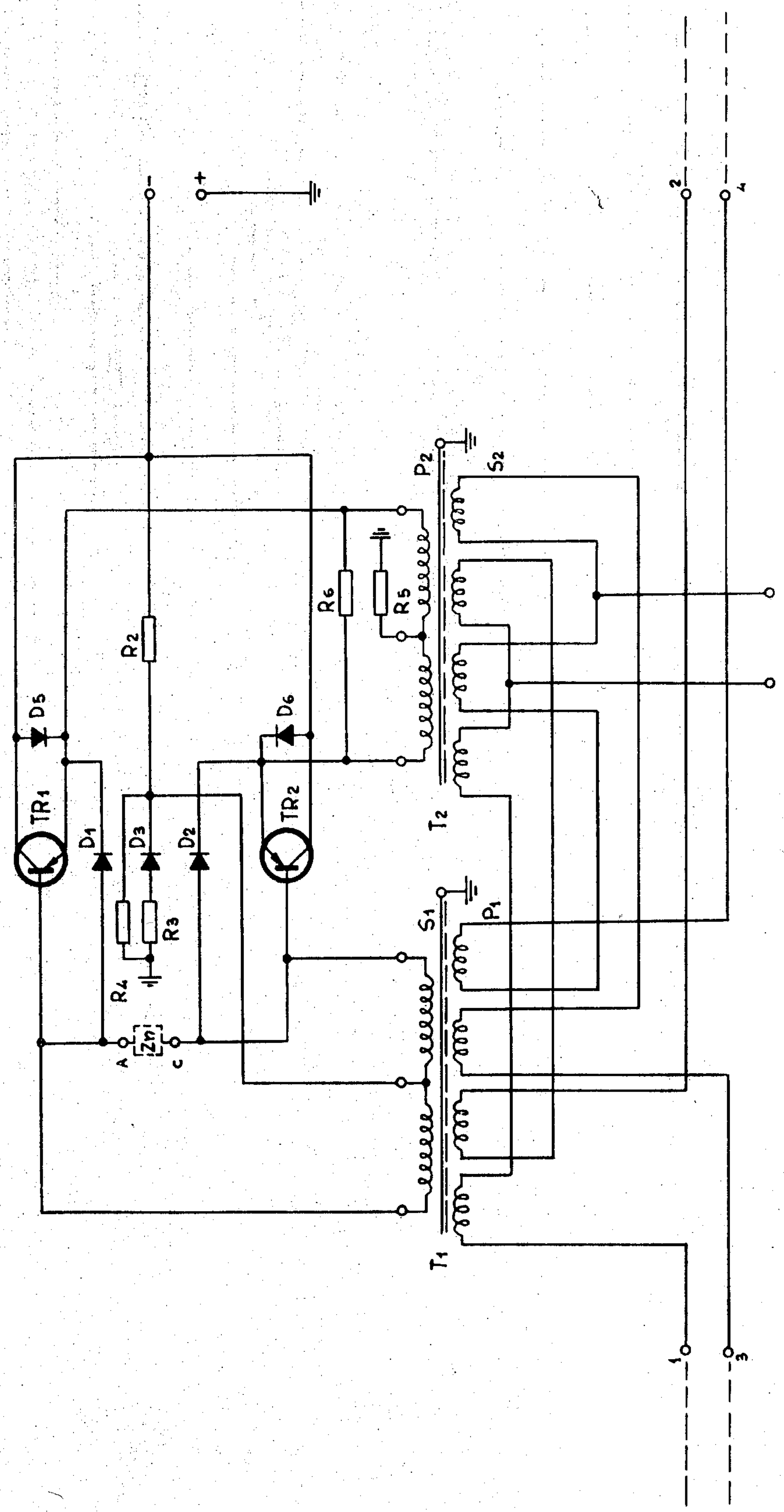
FIG. 3 shows a second diagram with more details, of a repeater in an embodiment improved with respect to the FIG. 2.

The amplifier, when used in telephone systems, must be suitably employed with a balanced circuit. FIG. 3 shows how this can be done by connecting transformers $T_1$ and $T_2$ into both transmission wires. Conventional equalizing is obtained by the impedance $Z_n$ connected between terminal A and C.

For the dimensioning of the amplifier it is advisable above all to select a value of $n_2$ for which the term $R_u/n_2^2$ (due to instability of characteristics and to the ageing of amplifier G) is sufficiently negligible. After having determined the value of $n_2$, it is necessary to determine the maximum value which $Z_n$ can assume, choosing it as high as possible, so that the space taken up by the capacitors contained in $Z_n$ is reduced. However, it should be substantially less than the input impedance of the amplifier G and the impedance of the secondary winding of the transformer $T_1$ measured with open primary, in order to reduce the influence of these two impedances on the impedance $Z_n$.

The parameters $Z_n$ and $n_2$ having been fixed, the value $n_1$, which makes it possible to obtain the highest gain, can be obtained by differentiating the equation for Z with respect to $n_1$ and setting it equal to zero.

This result is: $n_1=2n_2/A$.

With the repeater being coupled to the line through two separate transformers, the negative impedance is closed only on the line impedance. It is, therefore, possible to obtain the maximum theoretical gain, and the generation of oscillations during open circuit is not present. Moreover, the two transformers may have a low inductance, since this parameter, for transmission purposes, can easily be compensated by means of a condensator in series with the impedance $Z_n$. In general this reduction is not necessary as it produces a smaller gain in accordance with the smaller attenuation of the cable at low frequencies. Therefore the transformer construction is extremely simplified. Moreover, as both the transformers have a low inductance and then also a low resistance, an extremely reduced attenuation of the signal currents can be obtained. Particularly for the circuits through which a direct current does not pass during the conversation, low cost ferroxcube cores can be used. Therefore in practice, for the above reasons, the use of two transformers is not, in general, more expensive than the use of a single transformer.

In order to obtain a high stability of gain and a reduced non linear distortion, a preferred embodiment of the invention uses two transistors in push-pull operation. Since a high voltage gain can be obtained by means of one of the two transformers, the transistors have only the function of gaining power and are allowed to have a very high negative voltage feedback such as the one corresponding to an emitter follower. Moreover, the transformer, by means of which the output of the amplifier G is coupled to the line, can even be a step-down transformer, lowering the voltage so that the output resistance $R_u/n_2^2$ brought on the line is highly reduced, thus assuring an improved operational stability and an improved operation of the repeater as an impedance inverter.

The present invention yields an improved repeater of the type described, having an improved operating characteristic with the following advantages:

(a) a greater stability of characteristics when temperature changes,
(b) a lower attenuation given by the repeater if the power supply of the repeater is missing,
(c) elimination of saturation phenomena when signalling currents flow through the repeater, and elimination of the noises ensuing from such saturation.

With reference to FIG. 3, the circuit of the repeater according to the invention presents two input terminals 1, 3 and two output terminals 2, 4 between which the primary winding $P_1$ of transformer $T_1$ and the secondary winding $S_2$ of transformer $T_2$ are connected, said windings being divided in four equal winding sections.

Two winding sections of each transformer are series connected on each wire of the telephone line so to have a perfectly balanced connection. Besides the two sections of $S_2$, the two sections of $P_1$ are connected on each wire so as to have a symmetrical arrangement. The direction of the windings are such, that the magnetic fluxes generated by the four sections of the same winding are in the same direction. This symmetry is very useful, as it allows a repeater stable with closed terminals to be connected between the two sections of $S_2$.

The terminals of the secondary winding $S_1$ of transformer $T_1$, which is formed by two equal sections in series, are connected to the bases of two transistors $Tr_1$ and $Tr_2$ whose emitters are connected to the terminals of the primary winding $P_2$ of transformer $T_2$, which is also divided into two equal series connected sections.

The collectors of transistors $Tr_1$ and $Tr_2$ are connected together to the power supply, the other terminal of which is grounded.

Between the bases of transistors $Tr_1$ and $Tr_2$, that is, between terminals A and C, an "artificial" or "balancing" line, corresponding to the impedance $Z_n$ is connected.

Each of transistors $Tr_1$ and $Tr_2$ has a diode, $D_1$ or $D_2$ respectively, connected between the base and the emitter.

The central point of the secondary winding $S_1$ of transformer $T_1$ is grounded via the network formed by $D_3$, $R_3$, $R_4$, while the central point of the primary winding $P_2$ of transformer $T_2$ is grounded through the resistor $R_5$.

The resistance $R_6$ is connected between the emitters of transistors $Tr_1$ and $Tr_2$.

Between the emitter and the collector of each transistor a diode, respectively $D_5$ and $D_6$, is connected with its cathode at the emitter side, and its anode at the collector side.

The biasing voltage of the bases with respect to the emitters is obtained from the terminals of the bipole formed by $D_3$, $R_3$, $R_4$ through which flows the current coming from resistance $R_2$. This current flows through the diode $D_3$ in direct sense. By conveniently adjusting the diode characteristics and the values of the resistors, the variations of the current absorbed by transistors, as the temperature changes, can be reduced. In fact, since the direct resistance of said diodes diminishes by increasing temperature, the base biasing diminishes as well, and this can compensate the increase of absorbed current, which the transistors show when temperature increases.

Figure 4:
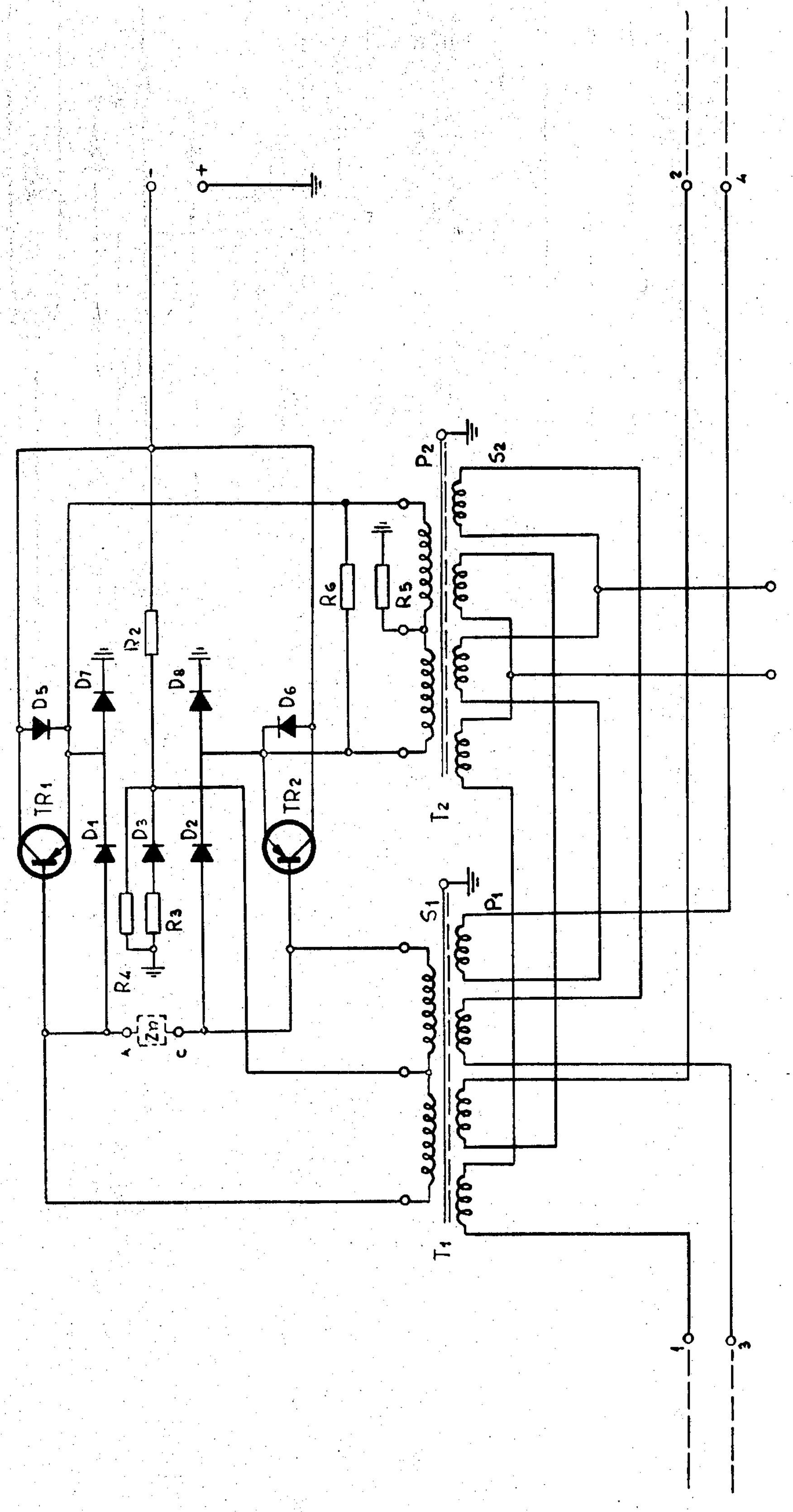
FIG. 4 is a modification of FIG. 3.

As to the second advantage enumerated above, it is obtained in the arrangement according to FIG. 3 by connecting the diodes $D_5$ and $D_6$ between the collector and the emitter of each transistor, and in the arrangement according to FIG. 4 by connecting each of the emitters to ground through two diodes $D_7$, $D_8$ having a low drop voltage, for instance germanium diodes; these diodes allow a reduction of the attenuation generated by the repeater, when the repeater for some reason is not supplied with power.

In fact diodes $D_5$ and $D_6$ (or respectively $D_7$ and $D_8$) having a low drop voltage, also behave as a sufficiently low impedance when the voltage applied to them is near to zero. When the repeater is fed such diodes are subjected to reverse voltage, while when the repeater is not fed said diodes, each of which is parallel connected to one of the half-windings of the primary $P_2$ of transformer $T_2$, through the resistance $R_5$, are subjected to the voltages induced on said windings by the conversation signals, from an impedance of such a low value that the attenuation when the repeater is not fed, is acceptable.

On the other side, since the behavior of said diodes is less efficient at low temperatures, a resistor $R_6$ is connected between the emitters of transistors $Tr_1$ and $Tr_2$. The resistor $R_6$ has the effect, maintained also at low temperatures, of reducing the attenuation when the repeater is not fed.

As it will be understood, when the repeater is not fed, the transformer $T_2$ shall have a minimum impedance, as it is short-circuited by said diodes and the resistor $R_6$.

Concerning the third advantage enumerated above, it is obtained by providing a suitable air gap in the magnetic circuit of the transformers $T_1$ and $T_2$ (FIGS. 3 and 4).

In this way it is obtained that the core of each transformer is not saturated, even when a high voltage is applied, due to the transmission of dialling signals.

This is very important when, during the conversation, a direct current is present in the line, or when, during the conversation industrial frequency pulses (e.g. of 50 Hz.) are transmitted for counting the fee to be paid. These pulses should not be distorted by saturation phenomena of the cores of transformers $T_1$ and $T_2$, otherwise their harmonics would invade the vocal frequencies band, causing an improper noise.

An important characteristic which a negative impedance repeater for telephone applications must have is to allow passage to the alternating signalling current of 50 Hz., without being damaged by the induced voltages. This condition, in the case of the repeaters having transistors may present many difficulties due to the limited maximum voltages which transistors can bear. In general it is necessary to have means for limiting the voltages induced by dialling. In the case of the repeater according to the invention, this limitation is obtained connecting said diodes $D_1$ and $D_2$ between the basis and the emitter of $Tr_1$ and $Tr_2$.

During the transmission of the currents, the voltage between the base and the emitter of the transistors is applied in opposed direction to the two diodes and, therefore, these exhibit a high reverse resistance, having a negligible influence on the transmission.

On the contrary, during the transmission of the dialling current, the high induced voltage in the circuit formed by the two windings of transformers $T_1$ and $T_2$, series connected through the transistors, causes the base and emitter of each transistor to function respectively as the cathode and the anode of a rectifier.

As it may be seen from FIG. 3, the current induced in said circuit has the possibility to circulate easily in both directions, by passing prevalently through a transistor and the opposed diode.

Thus, in consequence of the low resistances that the current finds in its passage, relatively low voltages are present between the electrodes of the transistors, which are easily tolerated.

The circulating currents are also of such a value as to be easily tolerated.

What is claimed is:

1. A negative impedance repeater for use with a transmission line comprising in combination first and second transformers, a transistor amplifier including two transistors connected in push-pull circuit arrangement having an emitter follower type output, the primary winding of said first transformer and the secondary winding of said second transformer being serially connected in the transmission line whereby the output voltage appearing across the secondary winding of said second transformer is in phase with the current flow in the transmission line, the secondary winding of said first transformer having each of its terminals connected to the base of one of said transistors, the primary winding of said second transformer having each of its terminals connected to the emitter of one of said transistors, the collector terminals of said transistors being connected to a source of DC power, a balancing impedance is connected between the base electrodes of said transistors and a biasing network including a resistor-diode network is connected in the base circuit of said transistors.

2. A negative impedance repeater according to claim 1, wherein the primary winding of said first transformer and the secondary winding of said second transformer are each divided in four winding sections, and two winding sections of each of said transformer windings are serially connected in each wire of a two wire transmission line.

3. A negative impedance repeater according to claim 1, wherein the primary winding of said second transformer is provided with a center tap grounded through a first resistor and a second resistor is connected across the entire primary winding of said second transformer.

4. A negative impedance repeater according to claim 1, wherein a diode is connected between the collector and emitter electrodes of each transistor, said diode oriented such that it is non-conducting when the power supply is energized and connected in circuit.

5. A negative impedance repeater according to claim 1, wherein a diode is connected between the emitter electrode of each transistor and ground.

6. A negative impedance repeater according to claim 1, wherein the secondary winding of said first transformer is provided with a center tap grounded through said biasing network, and said biasing network comprising a first resistor in parallel connection with a serially connected diode and second resistor.

References Cited

UNITED STATES PATENTS

| | | | |
|---|---|---|---|
| 2,904,641 | 9/1959 | Radcliffe, Jr. | 179—170 |
| 2,963,558 | 12/1960 | Cerofolini | 179—170 |

NATHAN KAUFMAN, Primary Examiner

U.S. Cl. X.R.

179—1; 307—303; 330—15